United States Patent

Kuroiwa et al.

[11] Patent Number: 6,111,937
[45] Date of Patent: Aug. 29, 2000

[54] APPARATUS AND METHOD FOR AUTOMATICALLY DETERMINING WHETHER A TELEPHONE SERVICE USER SPEAKS THE LANGUAGE OF THE SERVICE

[75] Inventors: Shingo Kuroiwa, Saitama; Shin-ichi Sakayori, Tokyo; Seiichi Yamamoto; Masanobu Fujioka, both of Saitama, all of Japan

[73] Assignee: Kokusai Denshin Denwa Kabushiki Kaisha, Tokyo, Japan

[21] Appl. No.: 08/891,997

[22] Filed: Jul. 14, 1997

[30] Foreign Application Priority Data

Aug. 23, 1996 [JP] Japan .................................. 8-239939

[51] Int. Cl.$^7$ ............................ H04M 1/64; H04M 15/00; H04M 3/00
[52] U.S. Cl. ................... 379/88.06; 379/67.1; 379/88.18; 379/115; 379/263
[58] Field of Search ........................ 379/67.1, 76, 88.01, 379/88.05, 88.18, 93.12, 101.01, 127, 211, 223, 88.06, 100.04, 115, 133, 263, 265

[56] References Cited

U.S. PATENT DOCUMENTS

| | | | |
|---|---|---|---|
| 4,958,366 | 9/1990 | Hashimoto | 379/74 |
| 5,003,584 | 3/1991 | Benyacar et al. | 379/119 |
| 5,033,088 | 7/1991 | Shipman | 381/43 |
| 5,136,633 | 8/1992 | Tejada et al. | 379/91 |
| 5,181,237 | 1/1993 | Dowden et al. | 379/88.01 |
| 5,199,062 | 3/1993 | Von Meister et al. | 379/67.1 |
| 5,210,789 | 5/1993 | Jeffus et al. | 379/127 |
| 5,703,935 | 12/1997 | Raissyan et al. | 379/88.01 |
| 5,703,943 | 12/1997 | Otto | 379/265 |

FOREIGN PATENT DOCUMENTS

| | | |
|---|---|---|
| 0 245 028 A2 | 4/1987 | European Pat. Off. . |
| 2292285 | 2/1996 | United Kingdom . |
| WO 88/05985 | 7/1988 | WIPO . |
| WO 95/27360 | 10/1995 | WIPO . |
| WO 96/08910 | 3/1996 | WIPO . |

*Primary Examiner*—Krista Zele
*Assistant Examiner*—Allan Hoosain
*Attorney, Agent, or Firm*—Westman, Champlin & Kelly, P.A.

[57] ABSTRACT

This invention is characterized by providing an apparatus for automatically discriminating service users which can prevent troubles from occurring between the service provider and users because of difference in language. When the service provider has a call from a user, the service provider makes an announcement to the user to request the voicing of a specific keyword. If an answer by the keyword is made from the user, it is determined whether or not it is an answer by the correct keyword. If correct, the call is connected to the service provider. If not correct, how to use the service is announced in another language. Then, the line is disconnected. As a result, a user who is weak in the language used by the service provider can be prevented from being connected to the service provider.

4 Claims, 2 Drawing Sheets

APPARATUS AND METHOD FOR AUTOMATICALLY DETERMINING WHETHER A TELEPHONE SERVICE USER SPEAKS THE LANGUAGE OF THE SERVICE

BACKGROUND OF THE INVENTION

1. Field of the Invention

The present inventions related to an apparatus for automatically discriminating service users, and particularly to a such apparatus in which users who do not understand the language used in a service are prevented from being connected to the service, thereby to enable the avoidance of various troubles which may occur between the service provider and users.

2. Description of the Related Art

Conventionally, as one of the services using international telephone calls, there has been an international telephone call service in which an international telephone operator in the U.S. is directly called from a foreign country, for instance, Japan. For instance, if an American living or travelling in Japan, or a foreigner who speaks English well wants to call someone in the U.S. from Japan, he can use this service to directly call an international telephone operator in the U.S. without through operator in Japan by originating a call to a specific number, and thus can call the party to be called by using only English. This service is very useful for those who are not confident in their ability for foreign languages such as Japanese, and often used in general.

In the international telephone call service, conventionally, as long as call is originated to the above-mentioned specific number, every international telephone calls is connected to the international telephone operator even if the user is an American or a foreigner who cannot speak English, or regardless of whether or not it is the prank call.

Further, in the U.S., there are medical services by telephone. By inputting the telephone number of a medical service, the user can consult with the operator of the medical service about a medical matter. Also in this case, regardless of whether or not the user can understand English, the line is connected to the medical service if the call is originated to the above telephone number.

However, there was a problem that, if the user of the service using international telephone calls or of a domestic telephone service was a foreigner who could not speak English, the communication between the operator of the service provider and the user could not be accurately performed, and sometimes a trouble occurred between the service provider and the user, and thus a service desired by the user could not be provided. Further, there was a problem that, since even the prank call by a caller who could not understand English was connected to the operator of the service provider, it was a burden to the operator's work and the proportion of the proper users of connection requests waiting for the connection to the operator became high.

SUMMARY OF THE INVENTION

It is an object of the present invention to eliminate the above described problems of the prior art, and provide an apparatus for automatically discriminating service users, which can prevent a trouble from occurring between the service provider and a user because of difference in language. It is a further object to provide an apparatus for automatically discriminating service users, in which, if a user cannot enjoy the service that the user first calls, a service by another language can be guided for the user. It is still a further object to provide an apparatus for discriminating service users, which can reduce the chance of overseas prank calls being connected to the operator of the service provider, thereby to lighten the burden to the operator's work.

To accomplish the above described objects, the present invention is an apparatus for automatically discriminating the users who use a service through a line, firstly characterized by comprising: an announcement sending part for making announcement in a certain language to request a user to speak a specific keyword unnecessary to be previously known by the user when the line is connected; a speech recognition part for determining whether or not an answer by the keyword has been made from the user; and a means for connecting the telephone call to the service provider when it is determined that an answer by the correct keyword has been made.

Further, the present invention is secondly characterized in that, at the time of line connection, an announcement is made in a certain language to request the user to perform a specific operation on the telephone of the user. Furthermore, the present invention is thirdly characterized in that, if the speech recognition part determines that an answer by the correct keyword has not been made, or if the signal detection part determines that the specific operation has not been performed, then the announcement sending part guides the user to receive the service by another language.

In accordance with the present invention, it is possible to exclude the application from a user who cannot understand the language used by the service provider. As a result, it is possible to prevent a trouble from being caused between the service provider and the user by a lack of communication due to difference in language. Further, to a user who cannot understand the language used by the service provider, how to use the service is announced in another language, and thus the user can receive the service in the strongest language of the user. Furthermore, it is possible to prevent the service provider from being connected to a user who is weak in languages, and from wasting time to handle it.

DETAILED DESCRIPTION OF THE PREFERRED EMBODIMENT

Figure 1:
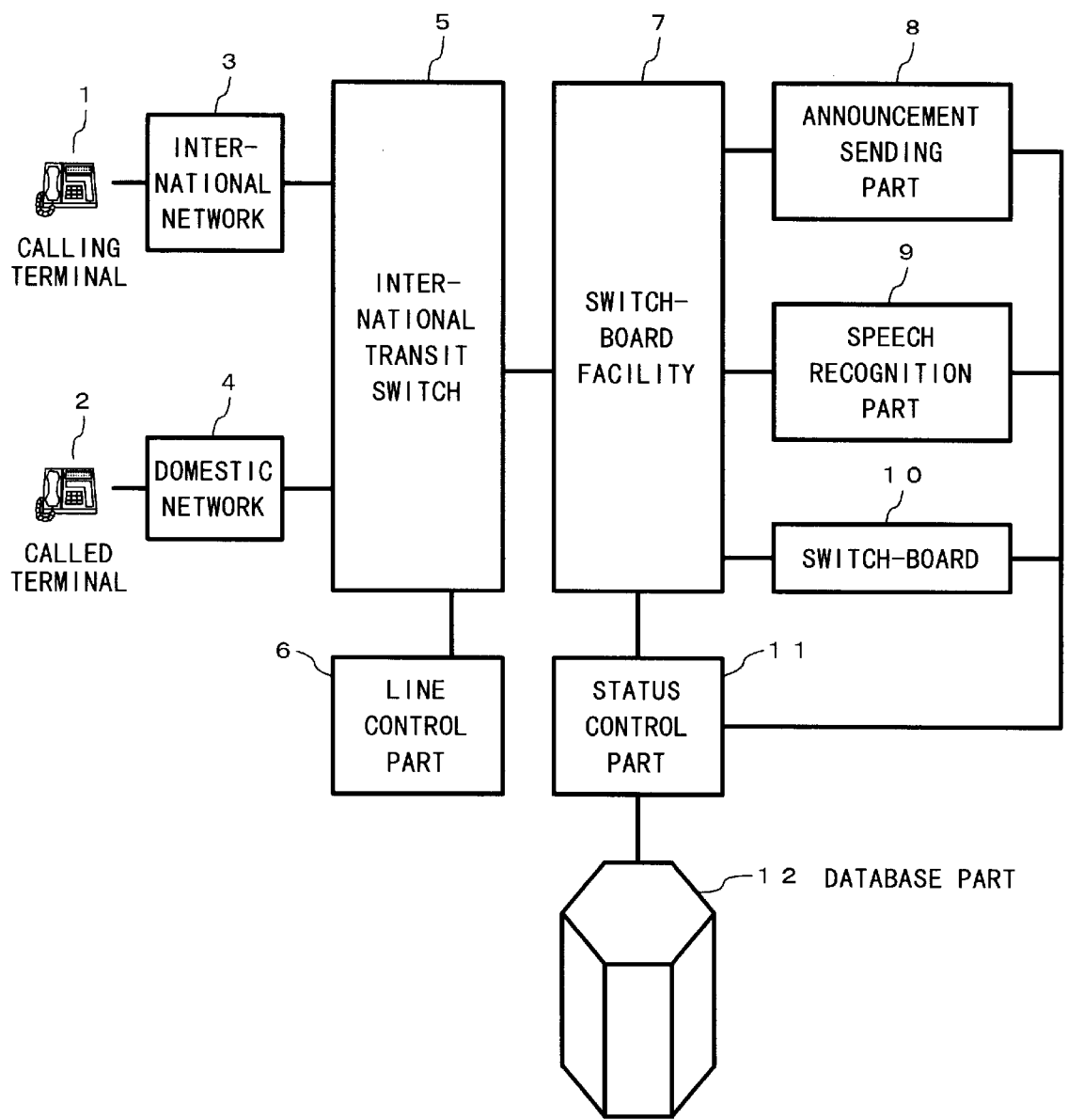
FIG. 1 is a block diagram for explaining the construction of an embodiment of the present invention.

The present invention is described in detail below with reference to the drawing. FIG. 1 is a block diagram schematically showing an embodiment of the present invention. Although this block diagram assumes an international telephone call service in which an international telephone operator in America is directly called from overseas, the present invention is not limited to this.

As shown, the system to which the present invention is applied comprises a calling terminal 1 installed in a foreign country, a called terminal 2 which is domestically installed, an international network 3 for connecting the calling terminal 1 with an international transit switch 5, a domestic network 4 for connecting the called terminal 2 with the international transit switch 5, the international transit switch 5, and a line control part 6. Further, the apparatus for automatically discriminating service users of this embodiment comprises a switch-board facility 7 attached to the international transit switch 5, an announcement sending part 8, a speech recognition part 9, a switch-board 10, a status control part 11 for controlling the operation of them, and a database 12 for storing service area numbers and the like.

Figure 2:
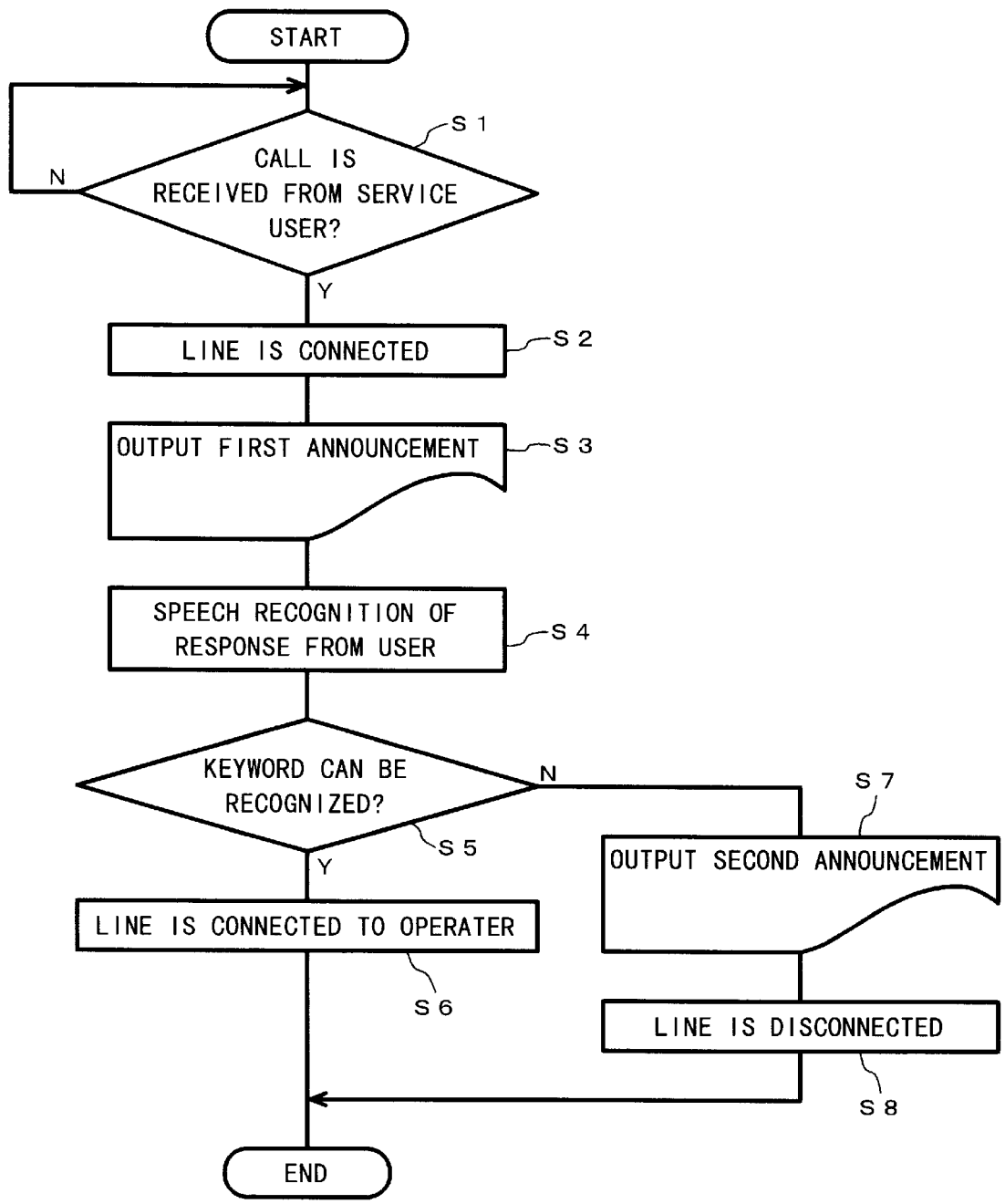
FIG. 2 is a flowchart for explaining the operation of the embodiment.

Now, the operation of the apparatus for automatically discriminating service users of this embodiment is described with reference to the flowchart of FIG. 2. First, in step S1, the line control part 6 determines whether or not a call is received from a service user. If this determination becomes positive, the process advances to step S2 where the user and the switch-board facility 7, the service provider, are connected through the international transit switch 5. In step S3, the status control part 11 activates the announcement sending part 8 to output the first announcement for prompting the user to voice a specific word (keyword) in the language for the service in order to examine whether the user can understand the language and speak in it. For instance, "A service user is requested to say 'guidance'", is announced in English. This word 'guidance' a specific keyword, need not be previously known by the user.

Then, in step S4, the speech recognition part 9 performs the speech recognition of the response from the user. And, in step S5, it is determined whether or not the keyword could be recognized. In the above example, it is determined whether or not the keyword='guidance' could be recognized. If this determination is positive, the process goes to step S6 where the status control part 11 connects the line to the switch-board 10 or the operator. On the other hand the above determination is negative, the process advances to step S7 to send out the second announcement from the announcement sending part 8. The second announcement is made in a language other than the language for the service, for instance, in Japanese, to guide how to use the service with that language. For instance, "Please call 001, then you can connect to the Japanese operator", is announced in Japanese. With this, a user who does not understand English can know how to receive the service by Japanese. In step S8, the line is disconnected.

In addition, since, as the cause of the negative determination in the above step S5, erroneous recognition may occur even if the keyword is correctly spoken, because of large noise or poor line environment, an announcement, for instance, "Your voice was not received, so please say 'guidance' again", may be made in English to perform the determination in step S5 again.

Now, the second embodiment of the present invention is described. This embodiment is characterized in that response by a keyword is not requested, but a key operation on the telephone terminal is requested. For instance, in the first announcement in the above step S3, "A service user is requested to press the buttons on the telephone, 1, 2, 3, and 4", is announced in English. Then, in the above step S4 and S5, it is determined whether or not the buttons have been correctly pressed, 1, 2, 3, and 4. If this determination is positive, the process advances to the above step S6 to connect the user to the operator, otherwise the process goes to the above step S7.

In accordance with this embodiment, if the user is an American, he can easily and accurately understand the contents of the announcement and correctly press the buttons on the telephone, 1, 2, 3, and 4, but a foreigner who does not understand English cannot understand the meaning of the announcement, so he cannot correctly press the buttons.

Now, the third embodiment of the present invention is described. The above example is related to the international telephone call service, but the present invention is not limited to this. For instance, it can also be applied to domestic medical services by telephone. In this case, in the first announcement in the above step S3, for instance, "This is the receptionist for medical service by English. A service user is requested to say 'English'", is sent out in English. To this, a user who understands English will correctly answer "English", so the process advances to step S6 to connect the telephone call to the person in charge of the medical service.

However, a user who does not understand English answers, for instance, "I cannot understand . . . " to the above first announcement, and thus the correct keyword is not returned. Then in step S7, guidance "Please call 001-1-123-4567, then you can connect to the Japanese Medical Response Center", is given in Japanese, and the line is disconnected. By this, a user who does not understand English can nearly completely prevented from being connected to the person in charge of the medical service by English. Further, a user who does not understand English can know how to receive the medical service by a language other than English through the second announcement made, for instance, in Japanese, and can receive the medical service.

Generally, if there is a third language which both the user and the operator can brokenly speak, and the user and the operator talk with each other by this third language, then the user can catch the service provider for an extremely long time. However, in accordance with this embodiment, since a user who does not understand English can be prevented from being connected to the service provider, the user and the operator do not talk with each other by a third language which both of them can brokenly speak, whereby the effective utilization of the line can be achieved, and it is possible to prevent the occurrence of a trouble between the service provider and the user due to a communication gap by difference in language.

As obvious from the above description, in accordance with the present invention, since a user who does not understand the language used by the service provider can nearly completely prevented from being connected to the service provider, troubles occurring between the service provider and users can be reduced as well as the time wasted between them.

Further, since the user is guided to the way for using the service by another language, the user can enjoy the service. Moreover, in the international telephone call service, overseas prank calls can nearly completely prevented from being connected to the operator of the service provider, and thus the burden to the operator's work can be largely lightened.

What is claimed is:

1. An apparatus for automatically determining whether service users who use a service through a telephone line can understand a language of the service, the apparatus comprising:

an announcement sending part adapted to make an announcement in the language of the service when the line is connected, the announcement requesting a user to speak a specific keyword unnecessary to be previously known by the user;

a speech recognition part adapted to determine whether or not said keyword is spoken by the user; and a means for connecting the telephone call to the service provider if it is determined that the keyword has been spoken, but not connecting the telephone call to the service provider if the keyword is not spoken.

2. An apparatus for automatically determining whether service users who use a service through a telephone line can understand a language of the service, as set forth in claim 1, wherein if said speech recognition part determines that the keyword has not been spoken, then said announcement sending part guides the user to receive said service in another language.

3. An apparatus for automatically determining whether service users who use a service through a telephone line can understand a language of the service, as set forth in claim 1, wherein if said speech recognition part determines that the keyword has not been spoken, then said announcement sending part again requests the user to speak the keyword.

4. A method of automatically determining whether service users who use a service through a telephone line can understand a language of the service, comprising:

when the line is connected, requesting a user to speak a specific keyword unnecessary to be previously known by the user, the request being made in the language of the service;

determining whether or not the keyword is spoken by the user; and connecting the telephone call to the service provider if the keyword is spoken by the user, but not connecting the telephone call to the service provider if the keyword is not spoken by the user.

\* \* \* \* \*